(12) United States Patent
Wegman

(10) Patent No.: US 10,364,591 B1
(45) Date of Patent: Jul. 30, 2019

(54) POST-EXTRACTING TOOL

(71) Applicant: Douglas Wegman, Fleetwood, PA (US)

(72) Inventor: Douglas Wegman, Fleetwood, PA (US)

( * ) Notice: Subject to any disclaimer, the term of this patent is extended or adjusted under 35 U.S.C. 154(b) by 106 days.

(21) Appl. No.: 15/785,578

(22) Filed: Oct. 17, 2017

(51) Int. Cl.
*E04H 17/26* (2006.01)
*A01G 23/06* (2006.01)

(52) U.S. Cl.
CPC ......... *E04H 17/265* (2013.01); *A01G 23/065* (2013.01)

(58) Field of Classification Search
CPC ............. B66F 7/00; B66F 11/00; B66F 15/00
See application file for complete search history.

(56) References Cited

U.S. PATENT DOCUMENTS

| | | | |
|---|---|---|---|
| 1,484,100 A * | 2/1924 | Wertz ...................... | F24B 15/10 294/11 |
| 1,700,008 A | 1/1929 | Wester | |
| 2,160,891 A | 6/1939 | Neff | |
| 2,233,821 A | 3/1941 | Ramer | |
| 2,454,309 A * | 11/1948 | Davis ........................ | B25B 7/12 269/211 |
| 2,505,923 A | 5/1950 | Taylor | |
| 2,806,734 A | 9/1957 | Klomp | |
| 3,273,933 A * | 9/1966 | Jochim ..................... | B66C 1/48 269/274 |
| 3,549,126 A | 12/1970 | Devries | |
| 3,945,087 A * | 3/1976 | Miller ..................... | B66F 19/00 254/131 |
| D651,059 S | 12/2011 | McDonald | |

FOREIGN PATENT DOCUMENTS

WO         2011153589 A     12/2011

* cited by examiner

*Primary Examiner* — Lee D Wilson
(74) *Attorney, Agent, or Firm* — Kyle A. Fletcher, Esq.

(57) ABSTRACT

The post-extracting tool is a pair of tongs adapted to remove posts, small trees, and bushes from the ground. Each arm of the tongs comprise a lever, a jaw and a loop. Each jaw has teeth that can bite into the object being removed. The arms of the tongs pivot at a pivot point. The post-extracting tool can be position near the object being removed with a set of teeth on either side of the object. A vehicle can be used to pull on the loops, simultaneously pulling the arms together so that the teeth bite into the object and pulling the tool and the object away.

18 Claims, 4 Drawing Sheets

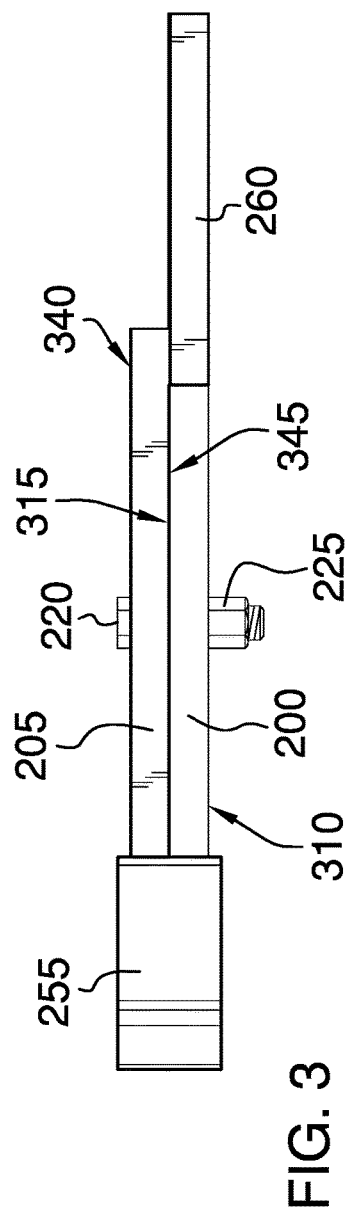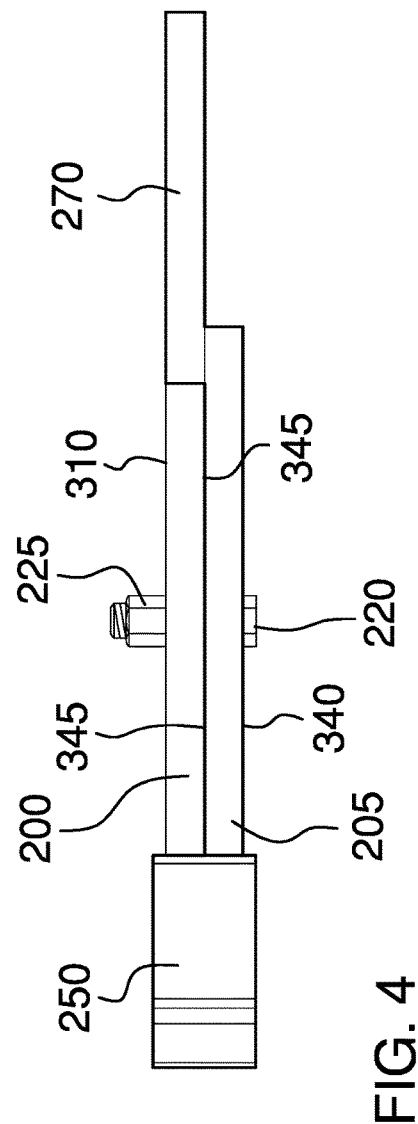

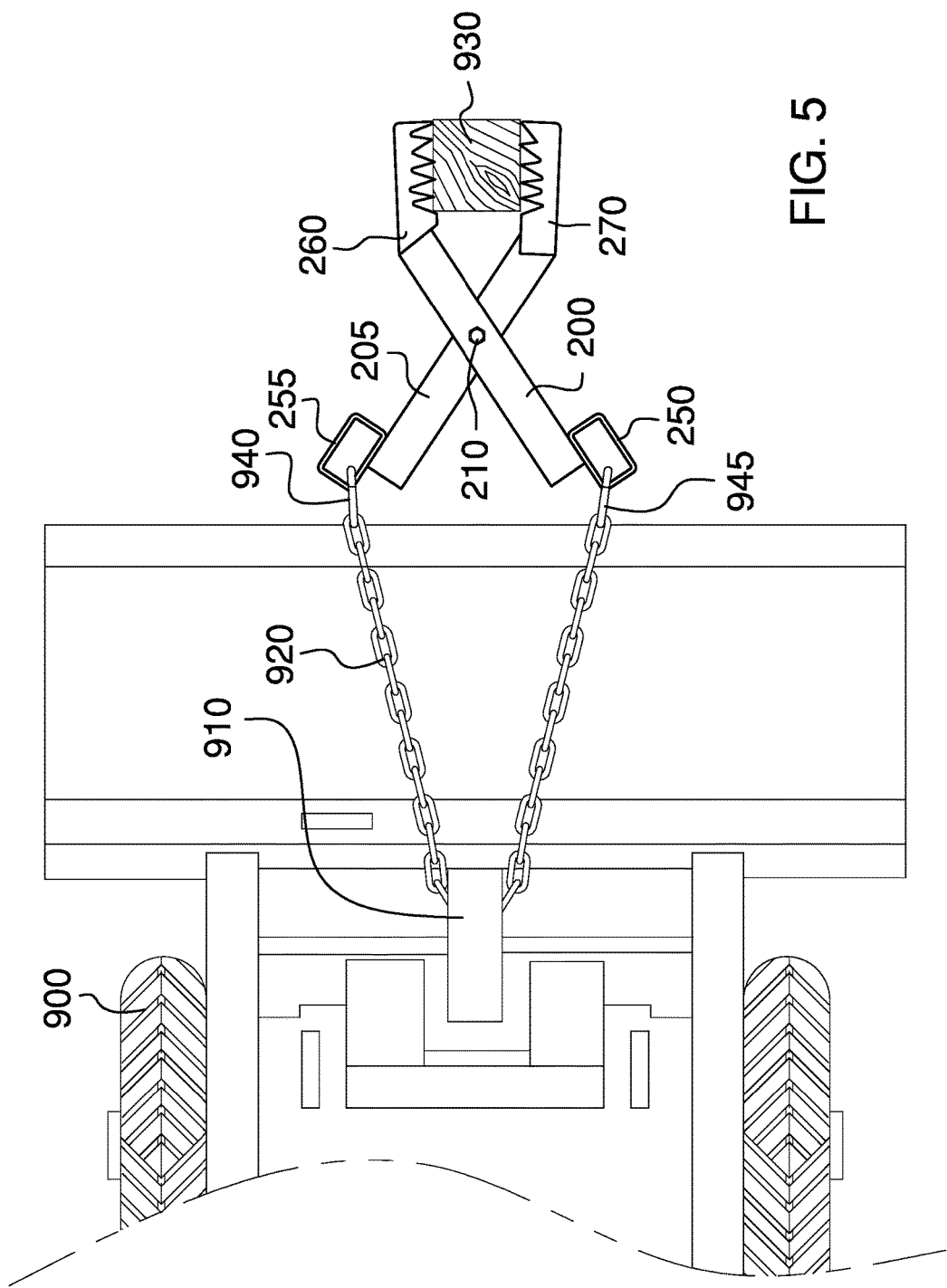

POST-EXTRACTING TOOL

CROSS REFERENCES TO RELATED APPLICATIONS

Not Applicable

STATEMENT REGARDING FEDERALLY SPONSORED RESEARCH

Not Applicable

REFERENCE TO APPENDIX

Not Applicable

BACKGROUND OF THE INVENTION

Field of the Invention

The present invention relates to the field of tools, more specifically, a post-extracting tool.

SUMMARY OF INVENTION

The post-extracting tool is a pair of tongs adapted to remove posts, small trees, and bushes from the ground. Each arm of the tongs comprises a lever, a jaw and a loop. Each jaw has teeth that can bite into the object being removed. The arms of the tongs pivot at a pivot point. The post-extracting tool can be position near the object being removed with a set of teeth on either side of the object. A vehicle can be used to pull on the loops, simultaneously pulling the arms together so that the teeth bite into the object and pulling the tool and the object away.

An object of the invention is to provide a tool that can remove a post or other object from the ground.

Another object of the invention is to provide the tool with two jaws with teeth for grasping the object.

A further object of the invention is to arrange that the teeth on each jaw are co-planar.

Yet another object of the invention is to provide loops on the tool that are opposite the jaws to allow pulling the tool by a vehicle.

These together with additional objects, features and advantages of the post-extracting tool will be readily apparent to those of ordinary skill in the art upon reading the following detailed description of the presently preferred, but nonetheless illustrative, embodiments when taken in conjunction with the accompanying drawings.

In this respect, before explaining the current embodiments of the post-extracting tool in detail, it is to be understood that the post-extracting tool is not limited in its applications to the details of construction and arrangements of the components set forth in the following description or illustration. Those skilled in the art will appreciate that the concept of this disclosure may be readily utilized as a basis for the design of other structures, methods, and systems for carrying out the several purposes of the post-extracting tool.

It is therefore important that the claims be regarded as including such equivalent construction insofar as they do not depart from the spirit and scope of the post-extracting tool. It is also to be understood that the phraseology and terminology employed herein are for purposes of description and should not be regarded as limiting.

BRIEF DESCRIPTION OF DRAWINGS

The accompanying drawings, which are included to provide a further understanding of the invention are incorporated in and constitute a part of this specification, illustrate an embodiment of the invention and together with the description serve to explain the principles of the invention. They are meant to be exemplary illustrations provided to enable persons skilled in the art to practice the disclosure and are not intended to limit the scope of the appended claims.

FIG. 3 is a top view of an embodiment of the disclosure.

FIG. 4 is a bottom view of an embodiment of the disclosure.

FIG. 5 is an in-use view of an embodiment of the disclosure.

DETAILED DESCRIPTION OF THE EMBODIMENT

The following detailed description is merely exemplary in nature and is not intended to limit the described embodiments of the application and uses of the described embodiments. As used herein, the word "exemplary" or "illustrative" means "serving as an example, instance, or illustration." Any implementation described herein as "exemplary" or "illustrative" is not necessarily to be construed as preferred or advantageous over other implementations. All of the implementations described below are exemplary implementations provided to enable persons skilled in the art to practice the disclosure and are not intended to limit the scope of the appended claims. Furthermore, there is no intention to be bound by any expressed or implied theory presented in the preceding technical field, background, brief summary or the following detailed description. As used herein, the word "or" is intended to be inclusive.

Figure 1:
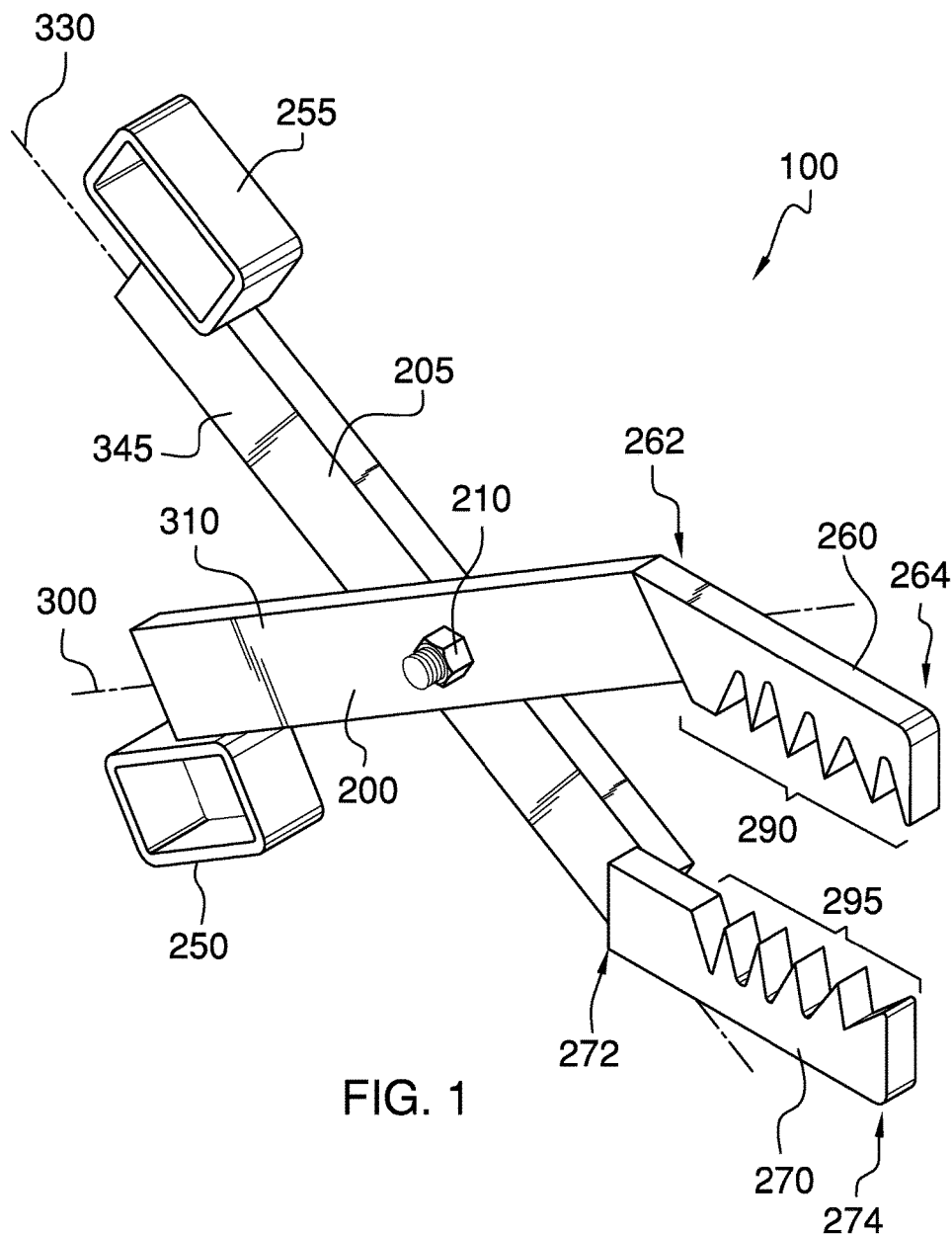
FIG. 1 is a perspective view of an embodiment of the disclosure.
Figure 2:
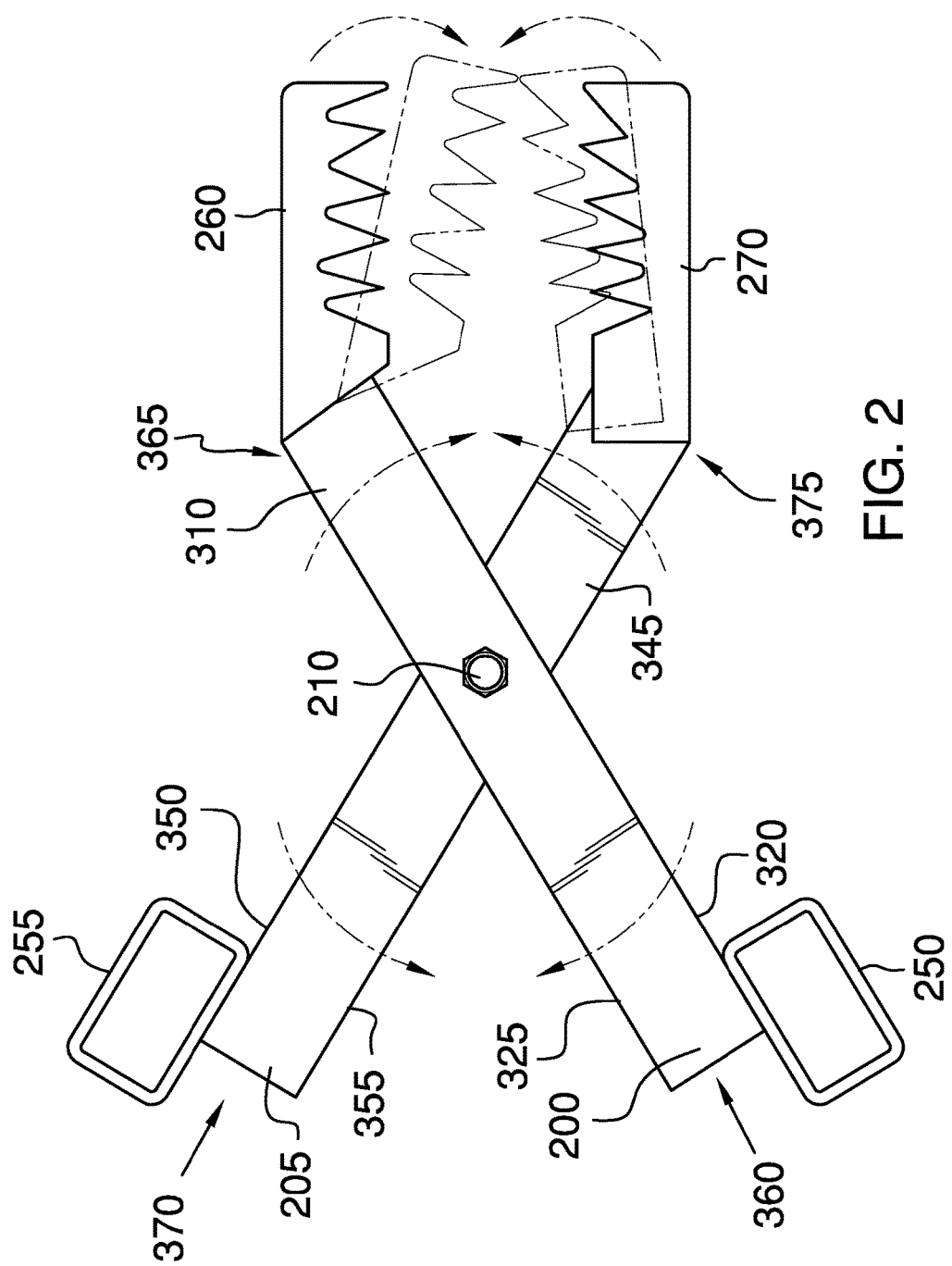
FIG. 2 is a front view of an embodiment of the disclosure.

Detailed reference will now be made to a first potential embodiment of the disclosure, which is illustrated in FIGS. 1 through 5.

The post-extracting tool 100 (hereinafter invention) comprises a first lever 200, a second lever 205, a first jaw 260, a second jaw 270, a first handle loop 250, a second handle loop 255, and a pivot point 210. The invention 100 comprises a pair of tongs that may be used to pull a post 930 from ground (not shown in the illustrations). The invention 100 may also be used to pull shrubs, small trees, or other objects that are embedded into the ground.

The first lever 200 and the second lever 205 may be solid, rectangular bars. A longitudinal axis of the first lever 300 runs through the center of the first lever 200 in the direction of its longest dimension. The largest sides of the first lever 200 are designated as an obverse face of the first lever 310 and a reverse face of the first lever 315. A first edge of the first lever 320 and a second edge of the first lever 325 are the faces between the obverse face of the first lever 310 and the reverse face of the first lever 315.

A longitudinal axis of the second lever 330 runs through the center of the second lever 205 in the direction of its longest dimension. The largest sides of the second lever 205 are designated as an obverse face of the second lever 340 and a reverse face of the second lever 345. A first edge of the second lever 350 and a second edge of the second lever 355 are the faces between the obverse face of the second lever 340 and the reverse face of the second lever 345. The first lever 200 may comprise a first pivot hole (not illustrated in the figures) drilled at the center of the obverse face of the first lever 310 extending through to the reverse face of the first lever 315. The second lever 205 may comprise a second pivot hole (not illustrated in the figures) drilled at the center of the obverse face of the second lever 340 extending through to the reverse face of the second lever 345.

Both the first jaw 260 and the second jaw 270 may be rectangular bars that are shorter in length than the first lever 200 and the second lever 205. The first jaw 260 comprises a first set of teeth 290 located on one edge of the first jaw 260 and the second jaw 270 comprises a second set of teeth 295 located on one edge of the second jaw 270. A first end of the first jaw 262 is cut at an angle of between 20 degrees and 60 degrees. A second end of the first jaw 264 may be left squared or may be rounded slightly to reduce risk of sharp edges. A first end of the second jaw 272 may be left squared. A second end of the second jaw 274 may be left squared or may be rounded slightly to reduce risk of sharp edges.

The first jaw 260 is coupled to the first lever 200 at a distal end of the first lever 365. Specifically, the first end of the first jaw 262 is butted against the distal end of the first lever 365 and then the first lever 200 and the first jaw 260 are welded or otherwise secured in that position. The angle of the cut on the first end of the first jaw 262 and the positioning of the first jaw 260 and the first lever 200 is such that from an observation point at a proximal end of the first lever 360 with the reverse face of the first lever 315 resting on a surface and the obverse face of the first lever 310 facing up, the first jaw 260 curves to the right. When they are coupled, the first lever 200 and the first jaw 260 are co-planar.

The second jaw 270 is coupled to the second lever 205 at a distal end of the second lever 375. Specifically, the first end of the second jaw 272 is placed on top of the distal end of the second lever 375 and oriented to the same angle as the first lever 200 and the first jaw 260, except in the opposite direction. The second jaw 270 and the second lever 205 are then welded or otherwise secured in that position. The positioning of the second jaw 270 and the second lever 205 is such that from an observation point at a proximal end of the second lever 370 with the obverse face of the second lever 340 resting on a surface and the reverse face of the second lever 345 facing up, the second jaw 270 curves to the left. When they are coupled, the second lever 205 and the second jaw 270 are not co-planar. Instead, the second jaw 270 is located above the second lever 205 in a plane that is parallel to the plane of the second lever 205.

The first lever 200, the second lever 205, the first jaw 260, and the second jaw 270 may be fabricated from metal. As a non-limiting example, the metal may be 2 inch by 1 inch steel bar.

The first handle loop 250 and the second handle loop 255 may be loops of metal. As a non-limiting example, the first handle loop 250 and the second handle loop 255 may be cross-sectional cuts from a hollow, rectangular steel tube.

In some embodiments, the first handle loop 250 and the second handle loop 255 may be formed from metal rod bent into a closed loop. The first handle loop 250 may be coupled to the first edge of the first lever 320 at the proximal end of the first lever 360. The second handle loop 255 may be coupled to the first edge of the second lever 350 at the proximal end of the second lever 370.

The pair of tongs is formed by pivotally coupling the first lever 200 and the second lever 205 at the pivot point 210. Specifically, the first lever 200 is positioned with the obverse face of the first lever 310 facing up, the second lever 205 is positioned with the reverse face of the second lever 345 facing down, and the second lever 205 is placed on top of the first lever 200. The first pivot hole is aligned with the second pivot hole and a bolt 220 may be passed through the first pivot hole and the second pivot hole to form the pivot point 210. A nut 225 may be used to hold the bolt 220 in place. The first set of teeth 290 and the second set of teeth 295 are co-planar and face each other such that if the first jaw 260 and the second jaw 270 are brought towards each other, an object between the first jaw 260 and the second jaw 270 will be squeezed between the first set of teeth 290 and the second set of teeth 295. The first handle loop 250 and the second handle loop 255 are on opposite sides of the pair of tongs such that if the first jaw 260 and the second jaw 270 are brought towards each other, the first handle loop 250 and the second handle loop 255 are not caught between the first lever 200 and the second lever 205.

In use, a pull vehicle 900 may be positioned a few feet away from the post 930 and the invention 100 may be placed such that the first set of teeth 290 and the second set of teeth 295 are on either side of the post 930 with the first handle loop 250 and the second handle loop 255 between the post 930 and the pull vehicle 900. The pull vehicle 900 may be a tractor, truck, bulldozer, skid loader, or other utility/construction vehicle equipped with a tow ring 910. A tow chain 920 may be passed through the tow ring 910 of the pull vehicle 900. A first clevis grab hook 940 on one end of the tow chain 920 may be hooked onto the first handle loop 250 or passed through the first handle loop 250 and then hooked back onto the tow chain 920. A second clevis grab hook 945 on the other end of the tow chain 920 may be hooked onto the second handle loop 255 or passed through the second handle loop 255 and then hooked back onto the tow chain 920.

The pair of tongs may be closed against the post 930 by manually pulling the first handle loop 250 and the second handle loop 255 towards each other. The pull vehicle 900 may be driven away from the post 930, pulling the invention 100 away from the post 930. As the pull vehicle 900 pulls the invention 100, the first handle loop 250 and the second handle loop 255 may be pulled towards each other by the tow chain 920, causing the first set of teeth 290 and the second set of teeth 295 to bite into the post 930. Movement of the pull vehicle 900 also pulls the invention 100 away from the post 930 and may pull the invention 100 in an upwards direction. Since the invention 100 is tightly grasping the post 930, a force is exerted on the post 930 causing it to pull out of the ground and follow the pull vehicle 900.

Unless otherwise stated, the words "up", "down", "top", "bottom", "upper", and "lower" should be interpreted within a gravitational framework. "Down" is the direction that gravity would pull an object. "Up" is the opposite of "down". "Bottom" is the part of an object that is down farther than any other part of the object. "Top" is the part of an object that is up farther than any other part of the object. "Upper" refers to top and "lower" refers to the bottom. As a non-limiting example, the upper end of a vertical shaft is the top end of the vertical shaft.

As used herein, the words "couple", "couples", "coupled" or "coupling", mean connected, either directly or indirectly and does not necessarily imply a mechanical connection.

As used in this disclosure, the terms "distal" and "proximal" may be used to describe the relative location of two objects. Distal is intended to mean the object, or the end of an object, that is situated away from the point of origin, point of reference, or point of attachment. Proximal is intended to mean the object, or end of an object, that is situated towards the point of origin, point of reference, or point of attachment. Distal implies 'farther away from' and proximal implies 'closer to'. In some instances, the point of origin or point of reference may be a center point or a central axis of an object and the direction of comparison may be in a radial or lateral direction.

As used herein, "front" means 1) the side of an object that is closest to a forward direction of travel under normal use of the object or 2) the side or part of an object that normally presents itself to view or that is normally used first. "Rear" or "back' is the side opposite the front.

As used herein, a "grab hook" or "clevis grab hook" is hook commonly used at the end of a transport chain. It attaches to the end of the chain using a pin or bolt. The grab hook has a narrow throat that securely fits over the side of a link in the chain and will not slide past the adjacent links, which is oriented perpendicularly to the link that the grab hook is grasping. Its intended use is for securing the end of the chain to a cargo or post by wrapping the chain around the item and hooking the end of the chain onto itself using the grab hook.

As used in this disclosure, a "lever" is a simple machine that comprises a shaft or armature that rotates around a fulcrum or pivot point.

As used herein, the word "longitudinal" refers to a lengthwise direction.

As used herein, the word "pivot" is intended to include any mechanical arrangement that allows for rotational motion. Non-limiting examples of pivots may include hinges, holes, posts, dowels, pins, points, rods, shafts, balls, and sockets, either individually or in combination.

As used in this disclosure, a "rod" is a straight structure in which two dimensions of the structure appear thin relative to a third dimension of the straight structure.

As used herein, a "tow chain", "transport chain", or "cargo chain" is a high quality, high strength steel chain intended for use in pulling or securing heavy loads. Clevis grab hooks are generally provided on each end of the tow chain.

As used herein, a "tow ring" or "tow hook" is a feature of a utility/construction vehicle that is provided to allow the attachment of a chain or rope to the vehicle for the purpose of pulling or towing an object. The feature may be annular (a ring) or open (a hook). The tow ring/tow hook is generally metal and thick to reset bending. In addition, the tow ring/tow hook is generally attached to a structural support or framework of the vehicle so that the vehicle is not damaged by pulling or towing the object.

As used in this disclosure, a "tube" is a hollow cylindrical device that is used for transporting liquids and gases. In this disclosure, the terms inner diameter and outer diameter are used as they would be used by those skilled in the plumbing arts. The line that connects the center of the first base of the cylinder to the center of the second base of the cylinder and is equidistant from the outer surface of the tube for its entire length is referred to as the centerline of the tube. When two tubes share the same centerline they are said to be aligned. When the centerlines of two tubes are perpendicular to each other, the tubes are said to be perpendicular to each other. As used here, "tubing" refers to a tube that is flexible or resilient.

With respect to the above description, it is to be realized that the optimum dimensional relationship for the various components of the invention described above and in FIGS. 1 through 5, include variations in size, materials, shape, form, function, and manner of operation, assembly and use, are deemed readily apparent and obvious to one skilled in the art, and all equivalent relationships to those illustrated in the drawings and described in the specification are intended to be encompassed by the invention.

It shall be noted that those skilled in the art will readily recognize numerous adaptations and modifications which can be made to the various embodiments of the present invention which will result in an improved invention, yet all of which will fall within the spirit and scope of the present invention as defined in the following claims. Accordingly, the invention is to be limited only by the scope of the following claims and their equivalents.

The inventor claims:

1. A post-extracting tool comprising:
a first lever, a second lever, a first jaw, a second jaw, a first handle loop, a second handle loop, and a pivot point;
wherein the post-extracting tool comprises a pair of tongs that are used to pull a post from ground;
wherein a first end of the second jaw is placed on top of the distal end of the second lever and oriented to the same angle as the first lever and the first jaw, except in the opposite direction;
wherein the second jaw and the second lever are secured in that position;
wherein the positioning of the second jaw and the second lever is such that from an observation point at a proximal end of the second lever with the obverse face of the second lever resting on a surface and the reverse face of the second lever facing up, the second jaw curves to the left;
wherein the second lever and the second jaw are non co-planar;
wherein the second jaw is located above the second lever in a plane that is parallel to the plane of the second lever.

2. The post-extracting tool according to claim 1
wherein the first lever and the second lever are solid, rectangular bars;
wherein a longitudinal axis of the first lever runs through the center of the first lever in the direction of its longest dimension;
wherein the largest sides of the first lever are designated as an obverse face of the first lever and a reverse face of the first lever;
wherein a first edge of the first lever and a second edge of the first lever are the faces between the obverse face of the first lever and the reverse face of the first lever;
wherein a longitudinal axis of the second lever runs through the center of the second lever;
wherein the largest sides of the second lever are designated as an obverse face of the second lever and a reverse face of the second lever;
wherein a first edge of the second lever and a second edge of the second lever are the faces between the obverse face of the second lever and the reverse face of the second lever.

3. The post-extracting tool according to claim 2
wherein the first lever comprises a first pivot hole, which is located at the center of the obverse face of the first lever extending through to the reverse face of the first lever.

4. The post-extracting tool according to claim 3
wherein the second lever comprises a second pivot hole, which is located at the center of the obverse face of the second lever extending through to the reverse face of the second lever.

5. The post-extracting tool according to claim 4
wherein both the first jaw and the second jaw is rectangular bars that are shorter in length than the first lever and the second lever.

6. The post-extracting tool according to claim 5 wherein the first jaw comprises a first set of teeth located on one edge of the first jaw and the second jaw comprises a second set of teeth located on one edge of the second jaw.

7. The post-extracting tool according to claim 6 wherein a first end of the first jaw is cut at an angle of between 20 degrees and 60 degrees.

8. The post-extracting tool according to claim 7 wherein the first jaw is coupled to the first lever at a distal end of the first lever.

9. The post-extracting tool according to claim 8 wherein the first end of the first jaw is butted against the distal end of the first lever and then the first lever and the first jaw are secured in that position;

wherein the angle of the cut on the first end of the first jaw and the positioning of the first jaw and the first lever is such that from an observation point at a proximal end of the first lever with the reverse face of the first lever resting on a surface and the obverse face of the first lever facing up, the first jaw curves to the right;

wherein the first lever and the first jaw are co-planar.

10. The post-extracting tool according to claim 9 wherein the second jaw is coupled to the second lever at a distal end of the second lever.

11. The post-extracting tool according to claim 10 wherein the first lever, the second lever, the first jaw, and the second jaw are fabricated from metal.

12. The post-extracting tool according to claim 11 wherein the metal is 2 inch by 1 inch steel bar.

13. The post-extracting tool according to claim 11 wherein the first handle loop and the second handle loop are loops of metal.

14. The post-extracting tool according to claim 13 wherein the first handle loop and the second handle loop are cross-sectional cuts from a hollow, rectangular steel tube.

15. The post-extracting tool according to claim 13 wherein the first handle loop and the second handle loop are formed from metal rod bent into a closed loop.

16. The post-extracting tool according to claim 13 wherein the first handle loop is coupled to the first edge of the first lever at the proximal end of the first lever;

wherein the second handle loop is coupled to the first edge of the second lever at the proximal end of the second lever.

17. The post-extracting tool according to claim 16 wherein the pair of tongs is formed by pivotally coupling the first lever and the second lever at the pivot point.

18. The post-extracting tool according to claim 17 wherein the first lever is positioned with the obverse face of the first lever facing up, the second lever is positioned with the reverse face of the second lever facing down, the second lever is placed on top of the first lever, the first pivot hole is aligned with the second pivot hole and a bolt is passed through the first pivot hole and the second pivot hole to form the pivot point and the bolt is held in place by a nut;

wherein the first set of teeth and the second set of teeth face each other such that if the first jaw and the second jaw are brought towards each other, an object between the first jaw and the second jaw is squeezed between the first set of teeth and the second set of teeth;

wherein the first handle loop and the second handle loop are on opposite sides of the pair of tongs such that if the first jaw and the second jaw are brought towards each other, the first handle loop and the second handle loop are not caught between the first lever and the second lever.

* * * * *